US008781683B2

(12) United States Patent
Williams

(10) Patent No.: US 8,781,683 B2
(45) Date of Patent: Jul. 15, 2014

(54) POWER STEERING APPARATUS AND METHOD

(75) Inventor: Daniel E. Williams, Lebanon, IN (US)

(73) Assignee: TRW Automotive U.S. LLC, Livonia, MI (US)

(*) Notice: Subject to any disclaimer, the term of this patent is extended or adjusted under 35 U.S.C. 154(b) by 0 days.

(21) Appl. No.: 13/159,472

(22) Filed: Jun. 14, 2011

(65) Prior Publication Data

US 2011/0313621 A1 Dec. 22, 2011

Related U.S. Application Data

(60) Provisional application No. 61/356,116, filed on Jun. 18, 2010.

(51) Int. Cl.
B62D 5/04 (2006.01)

(52) U.S. Cl.
USPC ...... 701/41; 701/1; 701/42; 701/50; 701/102; 477/3; 477/203; 180/402; 180/403; 180/422; 180/444; 180/446

(58) Field of Classification Search
CPC ............ F02D 41/0002; B60W 2510/0638; Y02T 10/40; B62D 5/04
USPC ............. 701/41, 42, 43, 31.4, 102, 22, 50; 417/182; 180/446, 444, 442, 423, 422, 180/421, 407, 404, 400, 6.44, 406; 123/339.16; 60/443, 445, 435, 424, 60/420
See application file for complete search history.

(56) References Cited

U.S. PATENT DOCUMENTS

| 2003/0146827 A1* | 8/2003 | Koike ........................... 340/435 |
| 2006/0008356 A1* | 1/2006 | Smith et al. ................... 417/182 |
| 2007/0257550 A1* | 11/2007 | Offerle et al. .................. 303/11 |
| 2008/0277187 A1* | 11/2008 | Williams et al. ............. 180/422 |
| 2010/0193272 A1* | 8/2010 | Jacobsen et al. ............. 180/69.3 |
| 2011/0022272 A1* | 1/2011 | Hung et al. ..................... 701/42 |
| 2011/0257866 A1* | 10/2011 | Jacobsen et al. ............. 701/102 |
| 2012/0130594 A1* | 5/2012 | Murty et al. ................... 701/42 |

FOREIGN PATENT DOCUMENTS

KR 2002081999 A * 10/2002

OTHER PUBLICATIONS

Machine translation KR2002081999 A, Kim G S.*

* cited by examiner

Primary Examiner — Tuan C. To
Assistant Examiner — Jelani Smith
(74) Attorney, Agent, or Firm — Tarolli, Sundheim, Covell & Tummino LLP

(57) ABSTRACT

An apparatus for use in turning steerable vehicle wheels includes a power steering motor assembly connected with the steerable vehicle wheels. An engine driven pump connected with the power steering motor assembly is driven by an engine of the vehicle to supply fluid under pressure to the power steering motor assembly. A controller increases engine speed when the vehicle is motionless and a steering wheel is rotated. A method for controlling the speed of an engine to provide a predetermined steering assist to a steering apparatus includes determining if the vehicle is motionless and determining if the steering wheel is being rotated. The speed of the engine is increased if the vehicle is motionless and the steering wheel is being rotated to provide the predetermined steering assist to the steering apparatus.

19 Claims, 2 Drawing Sheets

POWER STEERING APPARATUS AND METHOD

TECHNICAL FIELD

The present invention is directed to an apparatus and method for use in turning steerable vehicle wheels.

BACKGROUND OF THE INVENTION

In a conventional power steering system, an engine driven pump outputs a fixed volume of fluid per engine revolution. Thus, the flow rate of the pump is proportional to the engine speed. The pump is sized to provide the necessary flow so that an operator can easily steer the vehicle when the engine speed corresponds to highway cruising. An electric motor driven pump may be used to make up for a flow deficit at low engine speeds. However, the engine driven pump and the electric motor driven pump may not provide enough flow to permit turning of the steerable wheels when the vehicle is heavily loaded and motionless.

SUMMARY OF THE INVENTION

The present invention relates to an apparatus for use in turning steerable vehicle wheels including a power steering motor assembly connected with the steerable vehicle wheels. An engine driven pump connected with the power steering motor assembly is driven by an engine of the vehicle to supply fluid under pressure to the power steering motor assembly. A controller increases engine speed when the vehicle is motionless and a steering wheel is rotated.

The present invention also relates to a method for controlling the speed of an engine to provide a predetermined steering assist to a steering apparatus. The method includes determining if the vehicle is motionless and determining if the steering wheel is being rotated. The speed of the engine is increased if the vehicle is motionless and the steering wheel is being rotated to provide the predetermined steering assist to the steering apparatus.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
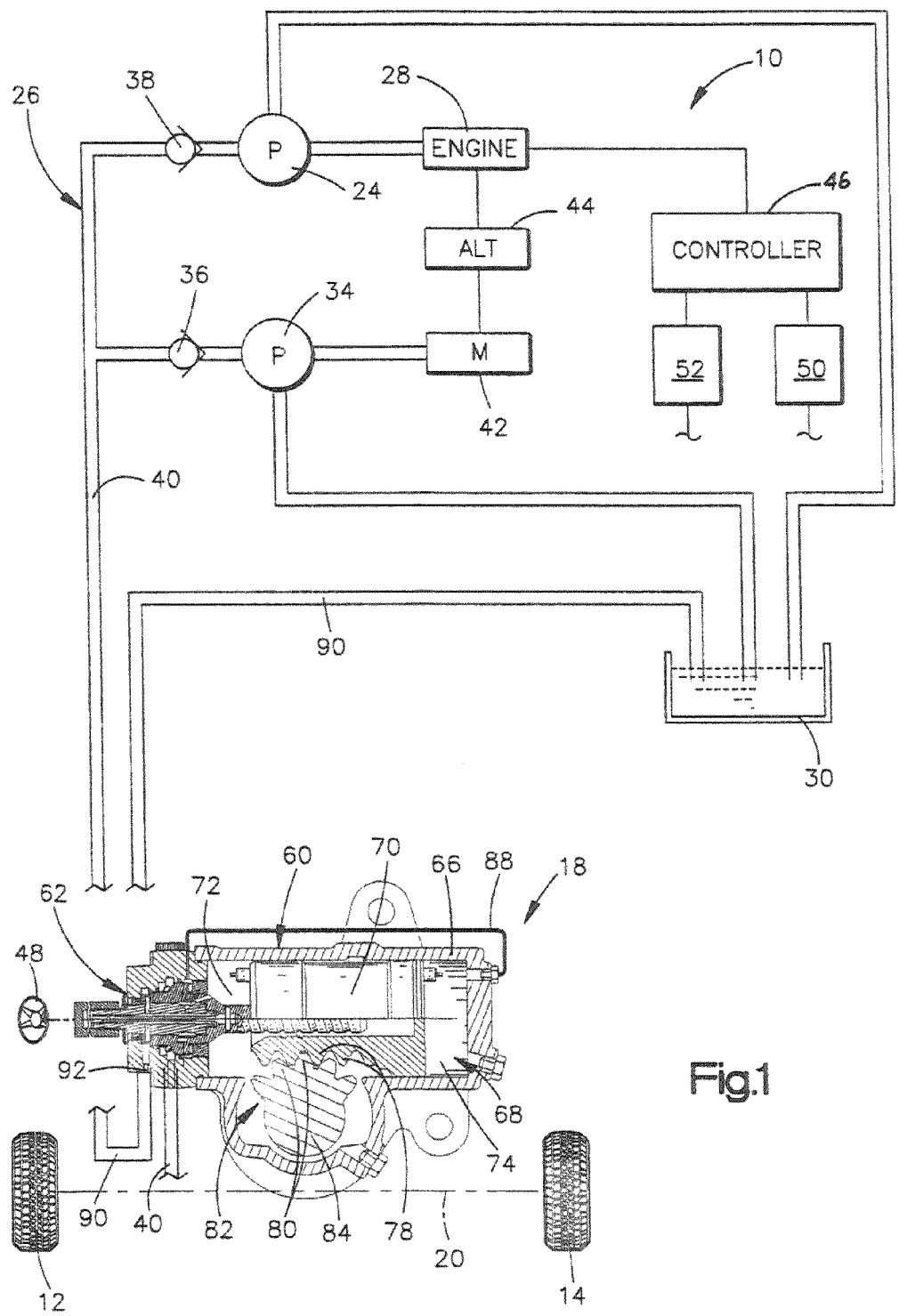
FIG. 1 is a schematic illustration of a power steering apparatus constructed and operated in accordance with the present invention.

A power steering apparatus 10 (FIG. 1) is used to turn steerable vehicle wheels 12 and 14. The power steering apparatus 10 includes a power steering motor assembly 18. The power steering motor assembly 18 is connected with the steerable vehicle wheels 12 and 14 by a steering linkage 20.

A first pump 24 is connected in fluid communication with the power steering motor assembly 18 by a conduit assembly 26. The first pump 24 is driven by an engine 28 of a vehicle so that the flow rate of the first pump is proportional to the engine speed. The first pump 24 is supplied with hydraulic fluid from a reservoir 30. Fluid exhausted from the power steering motor assembly 18 is returned to the reservoir 30.

A second pump 34 may also be connected in fluid communication with the power steering motor assembly 18 and the reservoir 30 by the conduit assembly 26. The first and second pumps 24 and 34 may be connected in parallel fluid communication with the power steering motor assembly 18. It is contemplated that the steering apparatus 10 may not include the second pump 34. Accordingly, the steering apparatus may only include the first pump 24 driven by the engine 28 for supplying fluid to the power steering motor assembly 18.

A check valve 36 is fluidly connected at the output of the second pump 34 and is effective to block fluid flow from the first pump 24 to the second pump 34. Another check valve 38 is fluidly connected at the output of the first pump 24 and is effective to block fluid flow from the second pump 34 to the first pump 24. A conduit 40 is fluidly connected to the output of each of the check valves 36, 38 and receives the combined flow of fluid from the first and second pumps 24, 34. The conduit 40 is also fluidly connected to the power steering motor assembly 18 to direct the combined flow of fluid to the power steering motor assembly 18.

The second pump 34 is driven by a variable speed electric motor 42. The motor 36 is electrically coupled to an alternator 44 that is driven by the engine 28. The operating speed of the electric motor 42 may be controlled in any desired manner. The operating speed of the electric motor 42 may be controlled in the manner described in U.S. Patent Application Publication No. 2008/0277187 the subject matter of which is incorporated herein by reference in its entirety.

A controller 46 is electrically connected to the engine 28. The controller 46 senses the speed of the engine 28. Alternatively, an engine speed sensor can be electrically coupled between the controller 46 and engine 28 for outputting a signal to the controller indicative of the engine speed. The controller 46 increases the speed of the engine 28 only when the vehicle is stopped and the steering wheel 48 is rotated.

The controller 46 is operable to increase the speed of the engine 28 when the vehicle is motionless and the hand wheel 48 is rotated. The controller 46 receives a signal from a steering angle sensor 50. The steering angle sensor 50 senses rotation of the steering wheel 48 and outputs a signal to the controller 46 indicating that the steering wheel is being rotated. The controller 46 also receives a motion signal from a transmission sensor 52. The transmission sensor 52 outputs a signal to the controller 46 indicative of the transmission being in neutral or park to indicate that the vehicle is motionless. Although a transmission sensor 52 is shown as being used to indicate movement or lack of movement of the vehicle, a vehicle speed sensor or a parking brake sensor may be used to detect movement or lack of movement of the vehicle. The controller 46 increases the speed of the engine 28 when the vehicle is motionless and the steering wheel 48 is rotated. The pump 24 supplies a greater flow to the power steering motor assembly 18 to permit turning of the steerable wheels 12, 14 when the vehicle is motionless.

Figure 2:
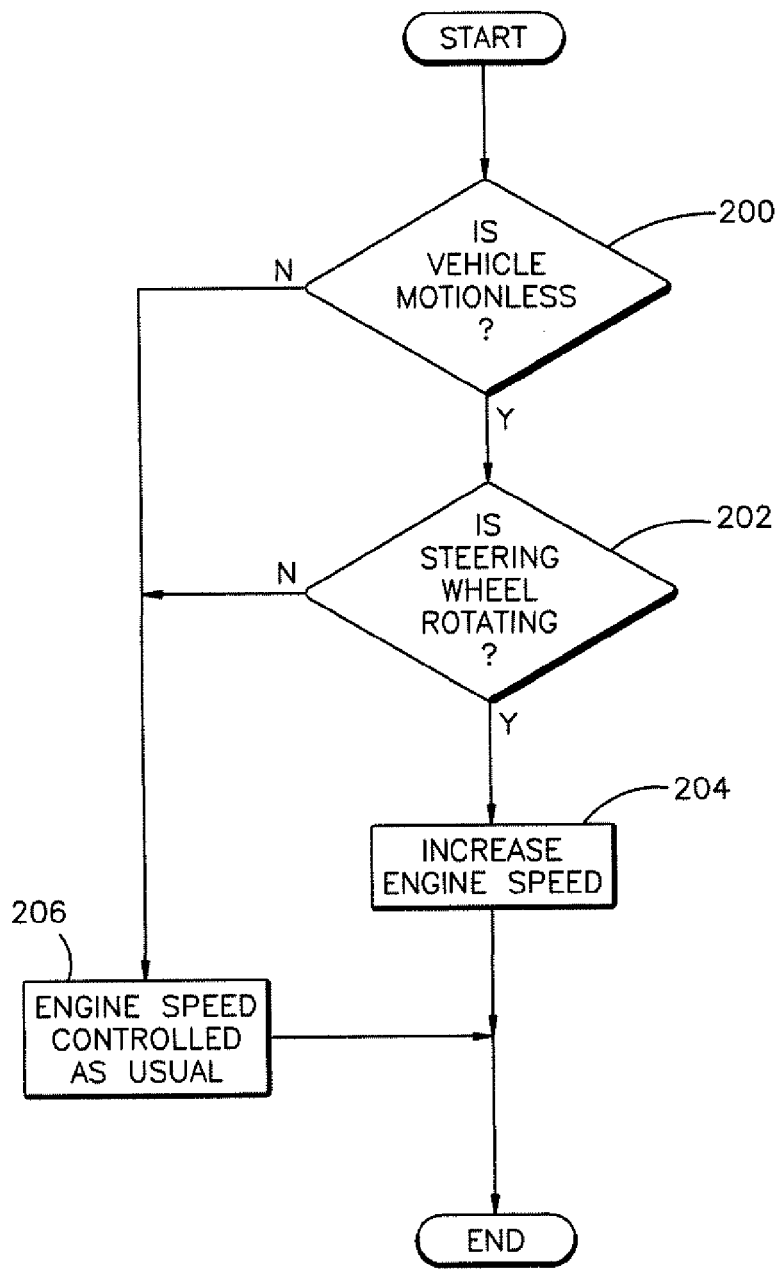
FIG. 2 is a flow chart showing the steps for controlling the vehicle engine.

FIG. 2 depicts the process for controlling the speed of the engine 28. The process starts when the controller 46 determines if the vehicle is motionless in step 200. If the determination in step 200 is yes, the controller 46 determines if the steering wheel 48 is being rotated in step 202. If the determination in step 202 is yes, the controller 46 increases the speed of the engine 28 to a predetermined speed in step 204. If the determination in either of steps 200 or 202 is no, the controller 46 does not change the speed of the engine 28 and the engine speed is controlled as usual in step 206. It is contemplated that the step 200 of determining if the vehicle is motionless may be executed after the step 202 of determining if steering wheel 48 is being rotated.

The power steering motor assembly 18 includes a power steering motor 60. The power steering motor 60 is connected in fluid communication with the pumps 24 and 34 and with the reservoir 30 by the conduit assembly 26.

A power steering control valve 62 is provided to control fluid flow to and from the power steering motor 60. The power steering control valve 62 is connected with the hand wheel 48. The power steering control valve 62 is operated in response to rotation of the hand wheel 48 to direct fluid flow to the power steering motor 60. Operation of the power steering motor 60 actuates the steering linkage 20 to effect turning movement of the steerable vehicle wheels 12 and 14 under the influence of force transmitted from the power steering motor to the steering linkage.

The power steering motor 60 includes a housing 66 having a chamber 68 in which a generally cylindrical piston 70 is disposed. The piston 70 is effective to divide the chamber 68 into a rod end portion 72 and a head end portion 74. The piston 70 is axially movable in the chamber 68 to vary the size of the rod end and head end portions 72 and 74 of the chamber 68.

Movement of the piston 70 in the housing 66 is effective to actuate the steering linkage 20. The piston 70 is connected to the steering linkage 20 through a linear array of rack teeth 78. The rack teeth 78 are disposed in meshing engagement with an arcuate array of pinion teeth 80. The pinion teeth 80 form part of a sector gear 82. The sector gear 82 is connected with an output shaft 84.

During operation of the power steering motor assembly 18, the piston 70 is moved under the influence of hydraulic fluid conducted from the first pump 24 or from both the first pump 24 and the second pump 34. Upon rotation of the hand wheel 48 to actuate the power steering control valve 62 in one direction, the fluid pressure in the head end portion 74 of the chamber 68 of the power steering motor 60 increases. In addition, the fluid pressure in the rod end portion 72 of the chamber 68 is exhausted to the reservoir 30.

This results in the piston 70 moving toward the left (as viewed in FIG. 1). As the piston 70 moves toward the left, the sector gear 82 is rotated in a counterclockwise direction (as viewed in FIG. 1) to actuate the steering linkage 20. Actuation of the steering linkage 20 is effective to turn the steerable vehicle wheels 12 and 14 in a first direction in a known manner.

Similarly, upon rotation of the hand wheel 48 in the opposite direction, the power steering valve 62 is actuated. Actuation of the power steering valve 62 is effective to direct high fluid pressure into the rod end portion 72 of the chamber 68 in the power steering motor 60 and to exhaust the head end portion 74 of the chamber 68 to the reservoir 30.

This results in the piston 70 in the power steering motor 60 moving toward the right (as viewed in FIG. 1). As this occurs, the sector gear 82 is rotated in a clockwise direction to actuate steering linkage 20. Actuation of the steering linkage 20 is effective to turn the steerable vehicle wheels in a second direction.

Upon actuation of the power steering control valve 62 in response to the rotation of the hand wheel 48 in a first direction, the power steering control valve 62 is effective to direct high fluid pressure to a conduit 88 in the power steering motor assembly 18. The left (as viewed in FIG. 1) end portion of the conduit 88 is connected with the power steering control valve 62. The right (as viewed in FIG. 1) end portion of the conduit 88 is connected with the head end portion 74 of the chamber 68 in the power steering motor 60.

Rotation of the hand wheel 48 in the first direction is effective to actuate the power steering control valve 62. Actuation of the power steering control valve 62 directs high fluid pressure to the conduit 88. The conduit 88 conducts the same high fluid pressure to the head end portion 74 of the chamber 68 in the power steering motor 60.

When the power steering control valve 62 is actuated to direct high fluid pressure to the conduit 88, the control valve 62 is also effective to connect the rod end portion 72 of the chamber 68 in the power steering motor 60 in fluid communication with the reservoir 30 through a conduit 90 in the conduit assembly 26. The rod end portion 72 of the chamber 68 is connected in fluid communication with the conduit 90 and the reservoir 30 through the actuated power steering control valve 62. Therefore, hydraulic fluid is exhausted from the power steering motor 60 through the power steering control valve 62 to the conduit 90 via return 92 and then to the reservoir 30 during operation of the power steering motor 60 in a first direction.

Similarly, when the hand wheel 48 is turned in the second or opposite direction, the power steering control valve 62 is effective to direct high pressure fluid to the rod end portion 72 of the chamber 68 in the power steering motor 60. At the same time, the power steering control valve 62 is effective to connect the head end portion 74 of the chamber 68 in the power steering motor 60 with the drain conduit 90.

The general construction of the power steering control valve 62 is well known. The power steering control valve 62 may have the same construction as is disclosed in U.S. Pat. No. 6,546,322. Of course, the power steering control valve 62 may have a different construction if desired.

It is contemplated that the power steering motor assembly 18 may have a construction which is different from the illustrated construction. For example, the power steering motor 60 may be of the general type which is used with a rack and pinion steering gear rather than an integral steering gear.

In operation, the engine 28 drives the first pump 24 to output fluid at a flow rate proportional to the engine speed. The motor 42 of the second pump 34 may be controlled in any desired manner. The motor 42 of the second pump 34 may be controlled in the manner described in U.S. Patent Application Publication No. 200810277187. It is also contemplated that the steering apparatus may not include the second pump 34 and the motor 42.

The controller 46 controls the engine speed when the vehicle is motionless and the steering wheel 48 is rotated. When the vehicle is in motion or the steering wheel 48 is not being rotated, the controller 46 does not control the engine speed.

It is contemplated that the steering apparatus 10 may not include the electric motor 36 and pump 34. The steering apparatus may only have the pump 24 driven by the engine 28. The pump 24 may be an undersized engine driven pump.

From the above description of the invention, those skilled in the art will perceive improvements, changes and modifications. Such improvements, changes and modifications are intended to be covered by the appended claims.

Having described the invention, the following is claimed:

1. An apparatus for use in turning steerable vehicle wheels, the apparatus comprising: a power steering motor assembly connected with the steerable vehicle wheels; an engine driven pump connected with the power steering motor assembly and driven by an engine of the vehicle to supply fluid under pressure to the power steering motor assembly; a sensor for detecting motion of the vehicle comprising a brake sensor that detects the application of a brake to produce a signal indicative of the vehicle being motionless; wherein the brake sensor comprises a parking brake sensor that detects when the vehicle is in park; and a controller that increases engine speed upon receiving a signal from the brake sensor indicating that the vehicle is motionless and when a steering wheel is rotated.

2. An apparatus as set forth in claim 1 further including a sensor for detecting rotation of the steering wheel, the controller increasing engine speed upon receiving a signal from the motion detecting sensor indicative of the vehicle being motionless and a signal from the rotation detecting sensor indicative of the steering wheel being rotated.

3. An apparatus as set forth in claim 2 wherein the motion detecting sensor further includes at least one of a transmission sensor and a vehicle speed sensor.

4. An apparatus as set forth in claim 2 wherein the rotation detecting sensor is a steering angle sensor.

5. An apparatus as set forth in claim 1 further including a motor driven pump connected with the power steering motor assembly and driven by a motor to supply fluid under pressure to the power steering motor assembly, the engine driven pump supplying fluid under pressure to the power steering motor assembly at a flow rate proportional to the speed of the engine, the engine driven pump and the motor driven pump supplying fluid to the power steering motor assembly to effect turning movement of the steerable vehicle wheels.

6. An apparatus as set forth in claim 5 wherein the controller is operatively connected with an electric motor connected to the motor driven pump, the controller effecting operation of the electric motor to drive the motor driven pump to supply fluid at a flow rate based on the speed of the engine.

7. An apparatus as set forth in claim 1 wherein the power steering motor assembly includes a power steering motor which is connected with the steerable vehicle wheels, the power steering motor being operable to effect turning movement of the steerable vehicle wheels under the influence of fluid supplied by the engine driven pump.

8. An apparatus as set forth in claim 7 wherein the power steering motor assembly is connected with a control valve which is operable in response to rotation of a steering wheel to direct fluid flow to the power steering motor assembly to effect turning movement of the steerable vehicle wheels under the influence of force transmitted from the power steering motor assembly.

9. An apparatus as set forth in claim 7 wherein the power steering motor assembly includes a piston which is movable under the influence of fluid pressure, rack teeth being connected with the piston and being disposed in meshing engagement with output gear teeth connected with a steering linkage that is connected with the steerable vehicle wheels.

10. A method for controlling the speed of an engine to provide a predetermined steering assist to a steering apparatus comprising: determining if the vehicle is motionless based upon a signal from a motion detecting sensor comprising a brake sensor detecting the application of a brake; determining if the steering wheel is being rotated; and increasing the speed of the engine if the vehicle is motionless and the steering wheel is being rotated to provide the predetermined steering assist to the steering apparatus; wherein the brake sensor comprises a parking brake sensor that detects when the vehicle is in park.

11. A method as set forth in claim 10 further including detecting rotation of the steering wheel with a sensor and increasing engine speed upon the motion detecting sensor sensing that the vehicle is motionless and the rotation detecting sensor sensing that the steering wheel is being rotated.

12. A method as set forth in claim 11 further including detecting motion of the vehicle with at least one of a transmission sensor and a vehicle speed sensor.

13. A method as set forth in claim 12 further including detecting rotation of the steering wheel with a steering angle sensor.

14. A method as set forth in claim 10 further including supplying fluid under pressure to the power steering motor assembly at a flow rate proportional to the speed of the engine with an engine driven pump to effect turning movement of the steerable vehicle wheels.

15. A method as set forth in claim 14 further including supplying fluid under pressure to the power steering motor assembly with a motor driven pump driven by a motor.

16. A method as set forth in claim 15 further including controlling an electric motor operatively connected to the motor driven pump to effect operation of the electric motor to drive the motor driven pump to supply fluid at a flow rate based on the speed of the engine.

17. A method as set forth in claim 15 further including directing fluid flow to the power steering motor assembly with a control valve operable in response to rotation of the steering wheel to effect turning movement of the steerable vehicle wheels under the influence of force transmitted from the power steering motor assembly.

18. An apparatus as set forth in claim 1, wherein the brake sensor comprises a parking brake sensor that detects when the vehicle is in park.

19. A method as set forth in claim 10 wherein the brake sensor comprises a parking brake sensor that detects when the vehicle is in park.

\* \* \* \* \*